(12) United States Patent
Brown et al.

(10) Patent No.: US 10,814,982 B2
(45) Date of Patent: Oct. 27, 2020

(54) CARGO HANDLING SYSTEMS AND METHODS

(71) Applicant: THE BOEING COMPANY, Chicago, IL (US)

(72) Inventors: Douglas Alan Brown, Edmonds, WA (US); William Robert Clos, Mukilteo, WA (US); Karen L. Hills, Everett, WA (US); Avery Riddle, Atlanta, GA (US); Cynthia A. Vandewall, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 463 days.

(21) Appl. No.: 15/401,451

(22) Filed: Jan. 9, 2017

(65) Prior Publication Data

US 2018/0194468 A1 Jul. 12, 2018

(51) Int. Cl.
*B64D 9/00* (2006.01)

(52) U.S. Cl.
CPC .......... *B64D 9/00* (2013.01); *B64D 2009/006* (2013.01); *Y02T 50/46* (2013.01)

(58) Field of Classification Search
CPC ..... B65G 67/24; B64D 9/00; B64D 2009/006
See application file for complete search history.

(56) References Cited

U.S. PATENT DOCUMENTS

| 4,170,292 A * | 10/1979 | Lang | B65G 25/10 |
| | | | 104/162 |
| 7,785,056 B2 | 8/2010 | Sanform | |
| 10,059,450 B2 * | 8/2018 | Levron | B64D 9/003 |
| 2009/0304482 A1 | 12/2009 | Sanford | |

FOREIGN PATENT DOCUMENTS

| DE | 27 35 737 | 2/1979 |
| WO | WO 2008091287 | 7/2008 |
| WO | WO 2014/049590 | 4/2014 |

OTHER PUBLICATIONS

Machine English translation of DE 27 357 37.
Extended European Search Report for EP 17203779.8-101, dated May 11, 2018.

* cited by examiner

*Primary Examiner* — Saul Rodriguez
*Assistant Examiner* — Willie Berry, Jr.
(74) *Attorney, Agent, or Firm* — The Small Patent Law Group LLC; Joseph M. Butscher

(57) ABSTRACT

A cargo handling system is configured to load and unload a cargo container with respect to a cargo holding area of a vehicle. The cargo handling system includes parallel roller tracks extending from a floor. The roller tracks are separated by a clearance space. The roller tracks include rollers that are configured to rotatably support the cargo container. A mobile cargo mover is configured to move within the clearance space. The cargo mover is configured to engage the cargo container to move the cargo container on the roller tracks. The cargo mover is configured to disengage the cargo container to move away from the cargo container.

44 Claims, 13 Drawing Sheets

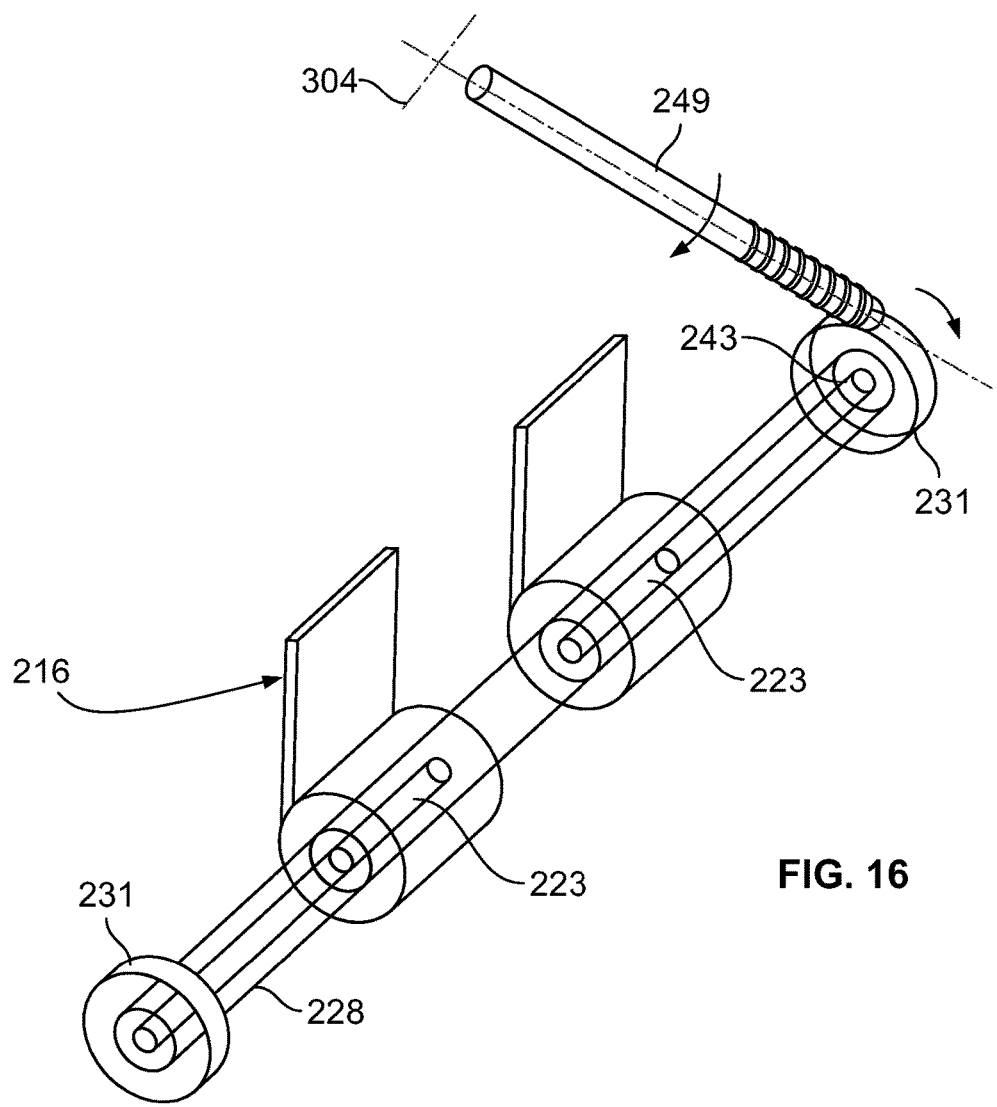
FIG. 16
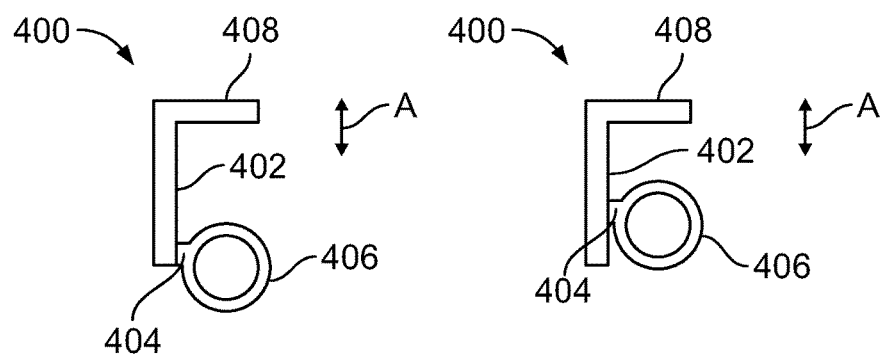
FIG. 17  FIG. 18

CARGO HANDLING SYSTEMS AND METHODS

FIELD OF EMBODIMENTS OF THE DISCLOSURE

Embodiments of the present disclosure generally relate to cargo handling systems and methods, and, more particularly, to cargo handling systems and methods that are used to load and unload cargo with respect to a cargo holding area of a vehicle, such as an aircraft.

BACKGROUND OF THE DISCLOSURE

Various vehicles are used to transport cargo between destinations. For example, various aircraft include cargo holding areas that are configured to receive and retain cargo containers.

A cargo handling system is used to load and unload cargo containers with respect to a cargo holding area of an aircraft. A typical cargo handling system includes a series of rollers permanently fixed to a floor of the cargo holding area. The cargo handling system also includes a plurality of costly and heavy electromechanical power drive units permanently fixed to the floor of the cargo handling area. The power drive units include motors and conveying members (such as powered rollers) that are used to move the cargo containers into and out of locations within the cargo holding area.

Because the power drive units are permanently fixed in position with respect to the aircraft, the power drive units take up space that may be otherwise used for various other purposes, such as additional cargo container restraints and conveyor rollers. Because the power drive units are permanently fixed in position with respect to the aircraft, the power drive units are Federal Aviation Authority (FAA)-certified airplane equipment that have associated high purchase and maintenance costs. Moreover, the power drive units are relatively bulky and heavy, thereby adding weight to the aircraft. As can be appreciated, heavier vehicles consume increased amounts of fuel during operation. Further, the power drive units typically require regular maintenance and servicing to ensure proper operation. If a power drive unit malfunctions, the power drive unit is removed and a new power drive unit is secured to the vehicle in its place. As can be appreciated, maintenance operations may result in increased downtime for an aircraft. Moreover, the process of installing power drive units onto an aircraft typically increases an overall manufacturing time.

Despite significant efforts to optimize known cargo handling systems, such systems are relatively expensive, heavy, require periodic maintenance and service to ensure proper operation, and add cost and complexity to an aircraft.

SUMMARY OF THE DISCLOSURE

A need exists for a cost effective cargo handling system. A need exists for a lighter cargo handling system, which reduces an overall weight of a vehicle. A need exists for a cargo handling system that may be easily serviced and maintained. A need exists for an aircraft having a cargo holding area of reduced complexity.

With those needs in mind, certain embodiments of the present disclosure provide a cargo handling system that is configured to load and unload a cargo container with respect to a cargo holding area of a vehicle. The cargo handling system includes roller tracks extending from a floor. The roller tracks are separated by a clearance space. The roller tracks include rollers that are configured to rotatably support the cargo container. A mobile cargo mover is configured to move within the clearance space. The cargo mover is configured to engage the cargo container to move the cargo container on the roller tracks. The cargo mover is configured to disengage the cargo container to move away from the cargo container.

The cargo mover is configured to move over a surface of the floor. The cargo mover is configured to be moved into and out of the cargo holding area. The cargo mover is not fixed in position on the floor. The cargo mover is configured to support less than all of the weight of the cargo container (such as an actual container, a pallet, or just actual cargo). At least some of the remaining portion of the weight of the cargo may be supported by fixed elements of the cargo handling system, such as the roller tracks.

In at least one embodiment, the cargo mover includes a main housing, and at least one conveyor extending from the main housing. The conveyor(s) is configured to move the cargo mover over the floor area. At least one cargo coupler extends from the main housing. The cargo coupler(s) is moveable between a retracted position in which the cargo coupler(s) is decoupled from the cargo container, and an extended position in which the cargo coupler(s) couples to the cargo container.

A first conveyor may extend from a first side of the main housing, and a second conveyor may extend from a second side of the main housing. Each conveyor may include a plurality of wheels, and one or more motors operatively coupled to at least one of the plurality of wheels. A track loop may extend around at least some of the plurality of wheels.

A first cargo coupler may extend from a first end of the main housing, and a second cargo coupler may extend from a second end of the main housing. Each cargo coupler may include an extension panel having a first end that connects to a pivot axle, and a second end of the extension panel that is opposite from the first end that connects to a latching panel. The latching panel is configured to engage the cargo container when the cargo coupler is in the extended position. An actuator may be coupled to the pivot axle. The actuator is configured to move the cargo coupler between the extended position in which the latching panel engages the cargo container, and the retracted position in which the latching panel disengages from the cargo container.

The cargo mover may be symmetrical about longitudinal and lateral axes. A remote control may be in communication with the cargo mover. The remote control is configured to control operation of the cargo mover. In at least one embodiment, the cargo mover includes a controller that is configured to control operation of the cargo mover.

The cargo handling system may also include a traction sub-system that is configured to allow the cargo mover to exert tractive force into the floor. In at least one embodiment, the traction sub-system includes one or more gear wheels extending from the main housing, and one or more gear tracks secured to one or both of the floor or roller tracks. The gear wheels are configured to engage the gear tracks. In at least one other embodiment, the traction sub-system includes a plurality of first teeth alternately separated by a plurality of first gaps of at least one conveyor of the cargo mover, and a plurality of second teeth alternately separated by a plurality of second gaps formed on the floor.

In at least one other embodiment, the traction sub-system includes one or more traction couplers that extend from the cargo mover. The traction couplers are configured to abut into an underside of the cargo container. The traction couplers may be configured to be moved between retracted and extended positions. In at least one embodiment, the traction couplers are spring-biased.

The cargo mover may include at least one guide roller that is configured to abut into at least one of the roller tracks.

Certain embodiments of the present disclosure provide a cargo handling method that configured to load and unload a cargo container with respect to a cargo holding area of a vehicle. The cargo handling method includes moving the cargo container onto an entry base of a cargo holding area of the vehicle, moving the cargo container off of the entry base onto parallel roller tracks that support the weight of the cargo container, maneuvering a mobile cargo mover within a clearance space between the roller tracks underneath the cargo container, coupling the cargo mover to the cargo container, driving the cargo mover to move the cargo container to a desired stowage position of the cargo holding area, decoupling the cargo mover from the cargo container, and driving the cargo mover within the clearance space underneath and away from the cargo container at the desired stowage position.

Certain embodiments of the present disclosure provide a vehicle that includes a cargo handling area defined by interior walls and a floor, and a cargo handling system that configured to load and unload a cargo container with respect to the cargo holding area.

BRIEF DESCRIPTION OF THE DRAWINGS

FIG. 16 illustrates a perspective top view of a cargo coupler operatively coupled to an actuator, according to an embodiment of the present disclosure.

FIG. 17 illustrates a lateral view of a cargo coupler in an extended position, according to an embodiment of the present disclosure.

FIG. 18 illustrates a lateral view of a cargo coupler in a retracted position, according to an embodiment of the present disclosure.

DETAILED DESCRIPTION OF THE DISCLOSURE

Figure 1:
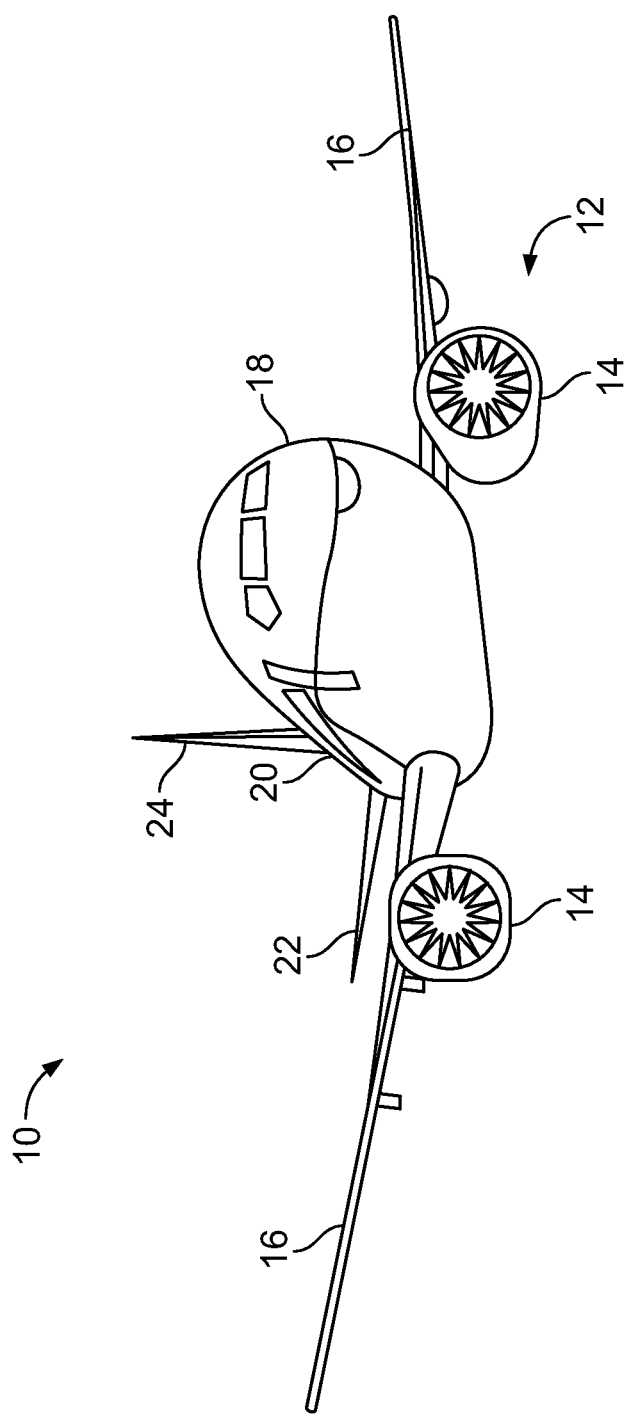
FIG. 1 illustrates a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide cargo handling systems and methods that are configured to load standard cargo containers aboard an aircraft. The cargo handling systems and methods are configured to move cargo containers with respect to a cargo handling area of an aircraft without the need for power drive units. As such, aircraft may be developed without power drive units, and power drive units onboard current aircraft may be removed, thereby reducing the weight of the aircraft.

In at least one embodiment, the cargo handling system includes rollers, guides, locks, standardized cargo containers and a floor. A mobile cargo mover, such as a robotic cargo mover, is configured to move substantially linearly along a fore/aft axis of a vehicle, such as between roller tracks. The cargo mover is configured to support less than all of the weight of a standardized cargo container. The cargo mover may include a traction sub-system that is configured to generate traction within the cargo holding area. In at least one embodiment, the traction sub-system includes a gear wheel that is configured to engage a reciprocal gear track on the floor and/or the roller track of the cargo handling system. In at least one other embodiment, the traction sub-system includes cogs that are configured to engage reciprocal openings formed in a floor and/or roller tracks. In at least one other embodiment, the traction sub-system includes a traction coupler, such as one or more spring-biased members, that are configured to push upwardly onto a lower surface of a cargo container to generate increased friction between the cargo mover and the floor of the cargo holding area.

Certain embodiments of the present disclosure provide a method of handling cargo aboard a vehicle. The method includes receiving a cargo container within a cargo holding area of a the vehicle, using a vehicle-mounted power drive unit to move the cargo container away from an entry area of the cargo holding area, and moving the cargo container to a stowage position using a remote controlled, portable cargo mover. The cargo mover may not be stowed within the vehicle during transportation of the cargo container to a different destination.

Embodiments of the present disclosure provide cargo handling systems and methods that may remove substantially all power drive units from a cargo holding area of a vehicle. As such, the weight of the vehicle is reduced. Further, additional space within the cargo holding area may be used to transport additional cargo. Further, aircraft may be developed without the cost of numerous power drive units within a cargo holding area.

FIG. 1 illustrates a front perspective view of a vehicle, such as an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger seating sections (for example, first class, business class, and coach sections), and an aft section. Each of the sections may be separated by a cabin transition area, which may include one or more class divider assemblies. Overhead stowage bin assemblies may be positioned throughout the interior cabin.

The fuselage 18 also defines a cargo holding area. In at least one embodiment, the cargo holding area may be within a portion of the interior cabin. In at least one other embodiment, the cargo holding area may be positioned underneath the interior cabin.

Alternatively, instead of an aircraft, embodiments of the present disclosure may be used with various other vehicles, such as automobiles, buses, locomotives and train cars, seacraft, spacecraft, and the like.

Figure 2:
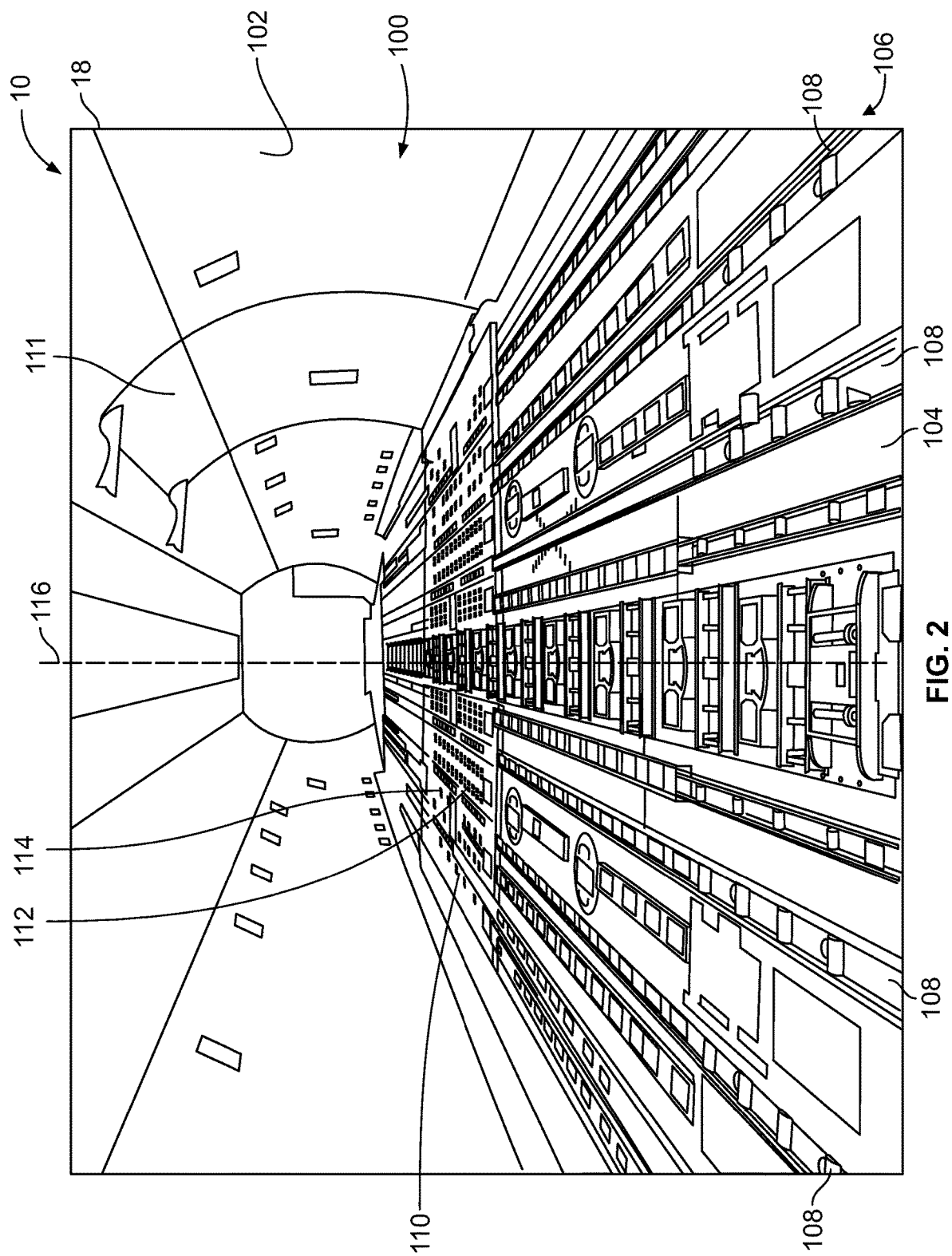
FIG. 2 illustrates an internal perspective view of a cargo holding area of an aircraft, according to an embodiment of the present disclosure.

FIG. 2 illustrates an internal perspective view of a cargo holding area 100 of the aircraft 10, according to an embodiment of the present disclosure. As noted, the cargo holding area 100 may be within the interior cabin or underneath the interior cabin of the aircraft 10.

The cargo holding area 100 is defined by interior walls 102, which may be defined by at least a portion of the fuselage 18. A floor 104 supports a cargo handling system 106 that includes a plurality of roller tracks 108 that connect to an entry area 110. The entry base 110 is proximate to at least one door 111 that is configured to be opened and closed. The entry base 110 may include a plurality of passive ball transfer units 112. The entry base 110 may also include one or more power drive units 114. The passive ball transfer units 112 and the power drive units 114 are configured to move a cargo container (not shown in FIG. 2) onto the entry base 110 through the open door 111. Optionally, the entry base 110 may not include any power drive units 114.

As an example, the cargo container is typically loaded onto the entry base 110 in a direction that is perpendicular to a longitudinal plane 116 of the cargo holding area 100. After the cargo container is positioned over the entry base 110, the ball transfer units 112 and/or the power drive units 114 are operated to move the cargo container onto a parallel pair of roller tracks 108. As described below, one or more cargo movers (not shown in FIG. 2) between the parallel roller tracks 108 are then operated to move the cargo container to a stowage area within the cargo holding area 100.

Figure 3:
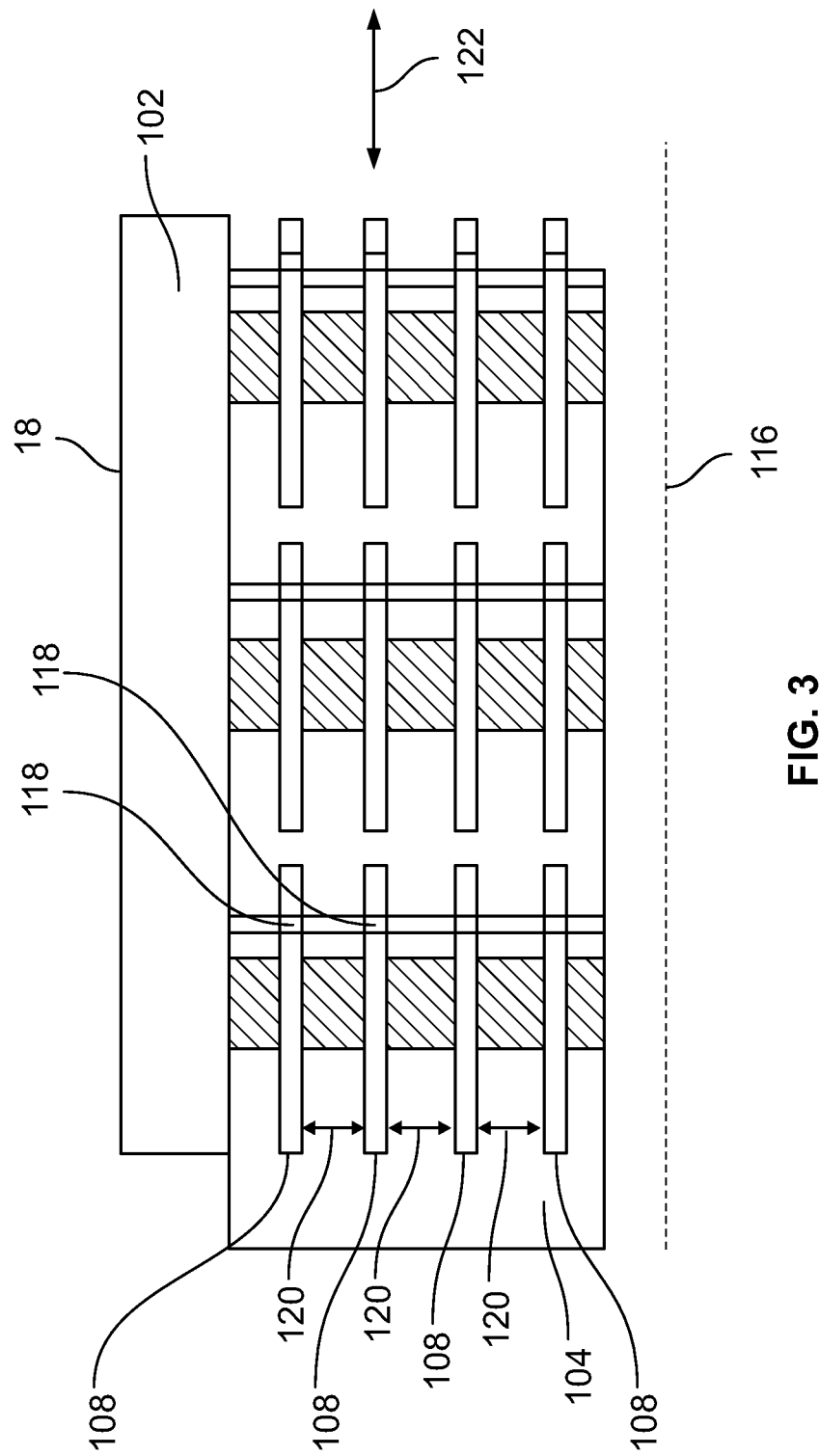
FIG. 3 illustrates a top plan view of a portion of a floor of a cargo holding area of an aircraft, according to an embodiment of the present disclosure.

FIG. 3 illustrates a top plan view of a portion of the floor 104 of the cargo holding area 100 of the aircraft 18, according to an embodiment of the present disclosure. The roller tracks 108 are parallel with one another and upwardly extend from the floor 104. Each roller track 108 includes a plurality of passive rollers (not shown in FIG. 3) that are configured to rotatably support a cargo container. Locks 118 may be coupled to the roller tracks 108. The locks 118 are configured to securely lock a cargo container in position on the roller tracks 108. In at least one embodiment, the locks 118 may be lock a roller in a locked position, thereby securing the cargo container in place on the roller tracks 108. In at least one other embodiment, the locks 118 may be separately engage a portion of the cargo container to restrain movement thereof on the roller tracks 108.

Clearance spaces 120 are provided between neighboring (that is, closest) parallel roller tracks 108 that are not coaxial with one another. As described below, a mobile cargo mover is configured to fit within the clearance spaces 120 and move linearly in directions denoted by arrows 122 that are parallel with the longitudinal plane 116 of the cargo holding area 100.

Figure 4:
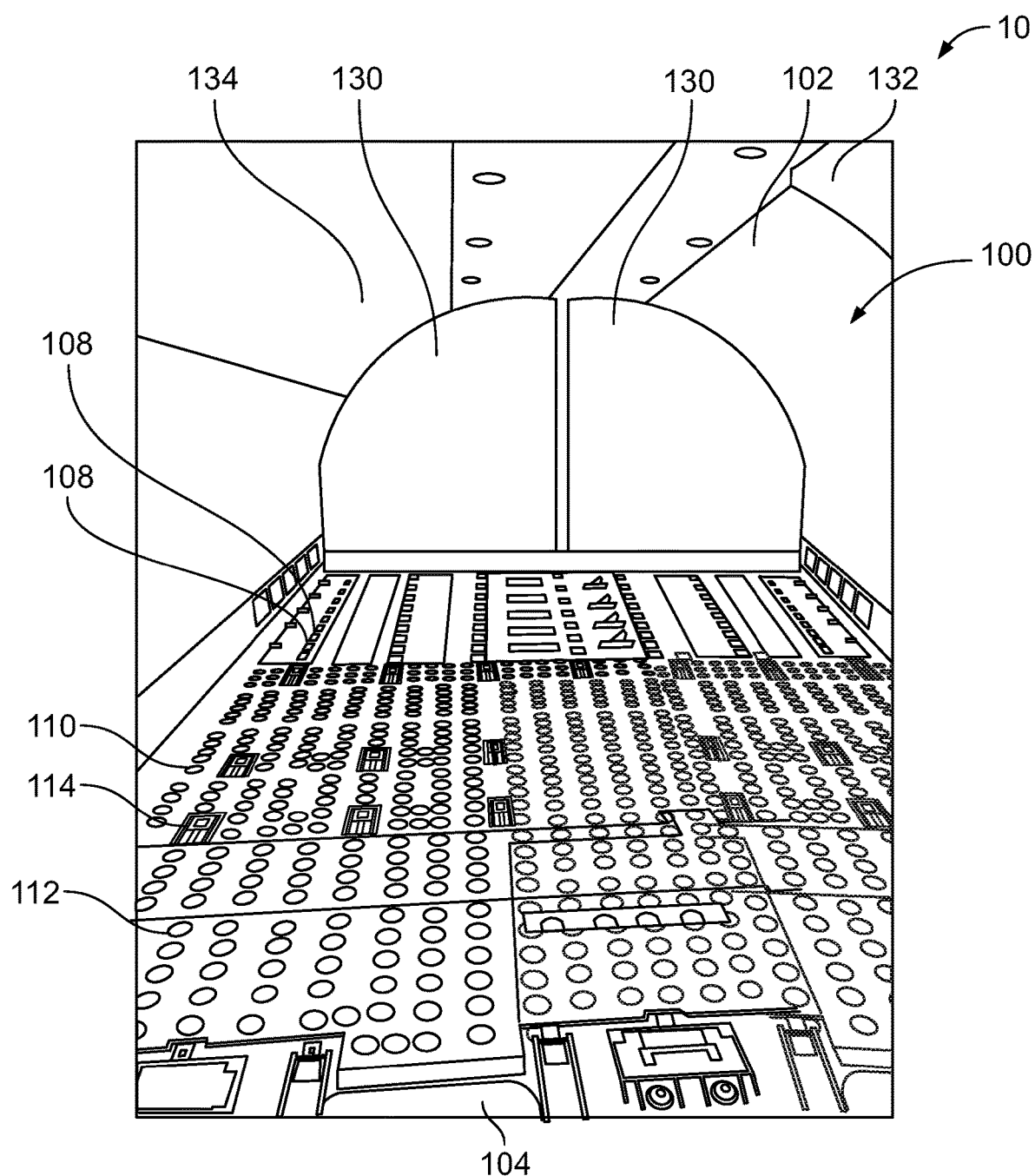
FIG. 4 illustrates an internal perspective view of a cargo holding area of an aircraft retaining cargo containers, according to an embodiment of the present disclosure.

FIG. 4 illustrates an internal perspective view of the cargo holding area 100 of the aircraft 10 retaining cargo containers 130, according to an embodiment of the present disclosure. Each cargo container 130 is first loaded onto the entry base 110 of the cargo holding area 100 through an opening 132 formed by an open door 111 (shown in FIG. 2). After the cargo container 130 is positioned over the entry base 110, the passive ball transfer units 112 and/or the power drive units 114 are used to move each cargo container 130 onto a parallel pair of roller tracks 108. One or more cargo movers (not shown in FIG. 4) positioned between the parallel roller tracks 108 are then operated to move the cargo container 130 to a stowage area 134 within the cargo holding area 100.

Figure 5:
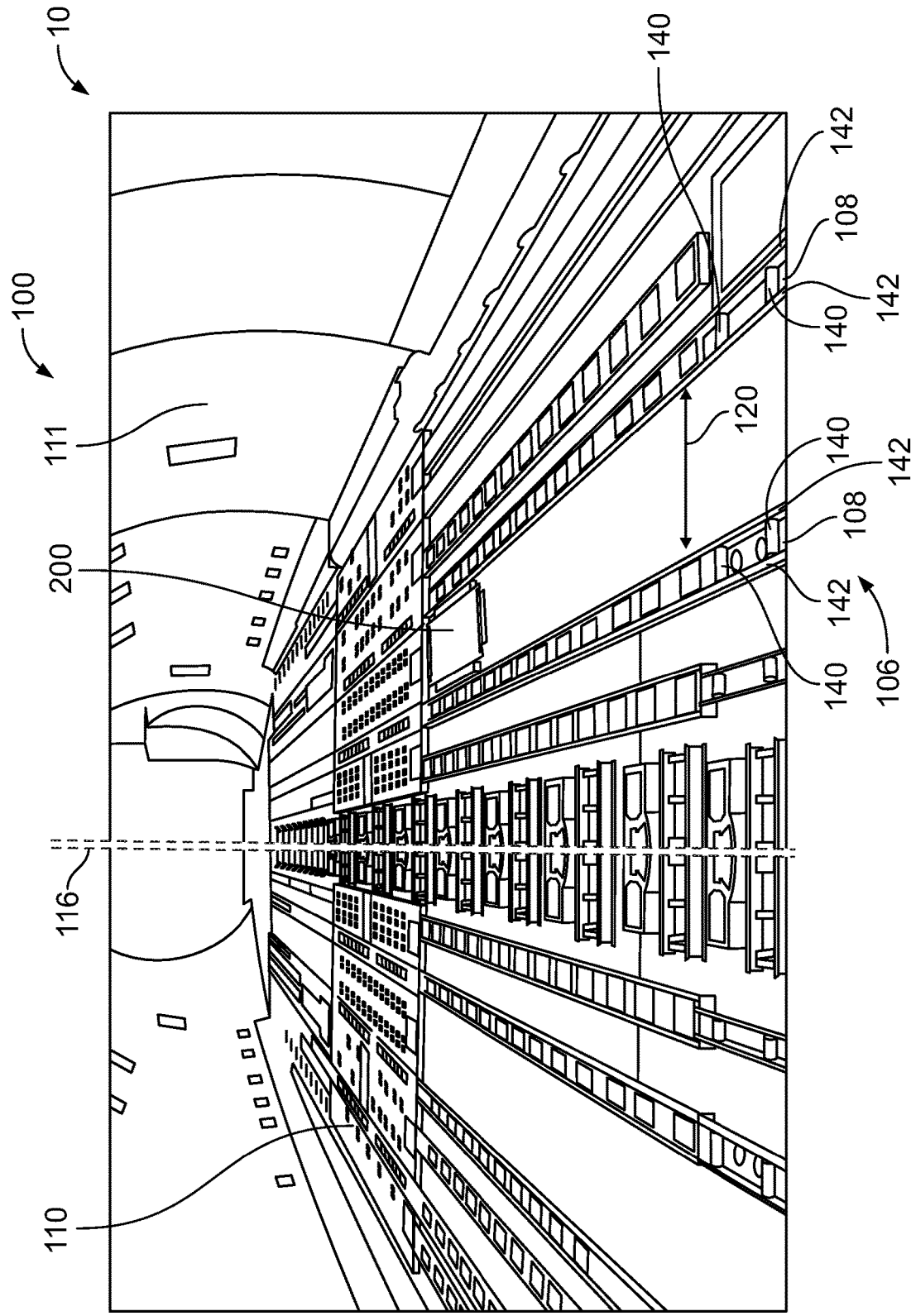
FIG. 5 illustrates an internal perspective view of a cargo holding area of an aircraft including a cargo handling system having a mobile cargo mover, according to an embodiment of the present disclosure.

FIG. 5 illustrates an internal perspective view of the cargo holding area 100 of the aircraft 10 including the cargo handling system 106 having a mobile cargo mover 200, according to an embodiment of the present disclosure. As shown, the cargo mover 200 is positioned on the floor 104 within a clearance space 120 between parallel roller tracks 108. Each roller track 108 includes a plurality or rollers 140 that are configured to freely rotate about an axis between track walls 142. The cargo mover 200 is configured to freely move between the parallel roller tracks 108 in linear directions that are parallel with the longitudinal plane 116 of the cargo holding area 100. The cargo mover 200 is not permanently fixed to the floor 104 or any other portion of the cargo holding area 100. As such, the cargo mover 200 may be freely boarded onto and removed from the cargo holding area 100. For example, during a cargo loading process, the cargo mover 200 is used to move the cargo containers 130 (shown in FIG. 3) into stowage areas. After the cargo containers 130 are loaded into the cargo holding area 100, the cargo mover 200 may be removed from the cargo holding area 100, thereby freeing space therein, and reducing weight onboard the aircraft 10. Notably, even if the cargo mover 200 remains in the cargo holding area 100, the weight of the aircraft 10 is reduced due to there being less or even no power drive units onboard.

As shown, a single cargo mover 200 is within the cargo holding area 100. It is to be understood, however, that the cargo handling system 106 may include multiple cargo movers 200. Each of the cargo movers 200 may be operated through a remote control (not shown in FIG. 5), which may be communicatively coupled to the cargo mover 200 via a wired (e.g., coupled via a handle or tether) or wireless connection. In at least one other embodiment, each of the cargo movers 200 may include a controller that is configured to automatically operate the cargo mover 200 without human intervention. For example, multiple cargo movers 200 may include position and proximity sensors that allow the cargo movers 200 to automatically move the cargo movers 200 to stowage locations. Further, multiple cargo movers 200 may be in communication with one another to cooperate in a coordinated fashion to move the cargo containers with respect to the cargo holding area 100.

Figure 6:
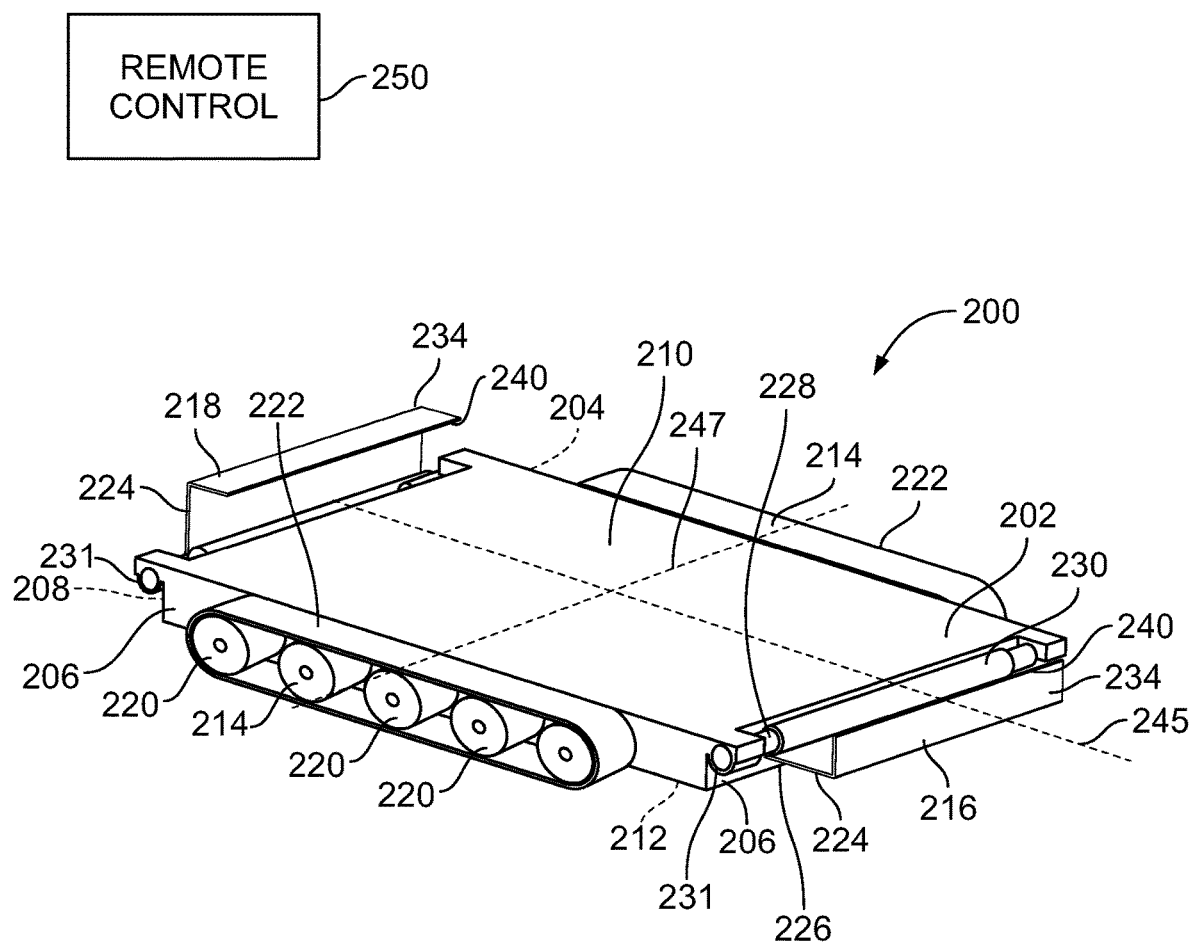
FIG. 6 illustrates a top perspective view of a cargo mover, according to an embodiment of the present disclosure.
Figure 7:
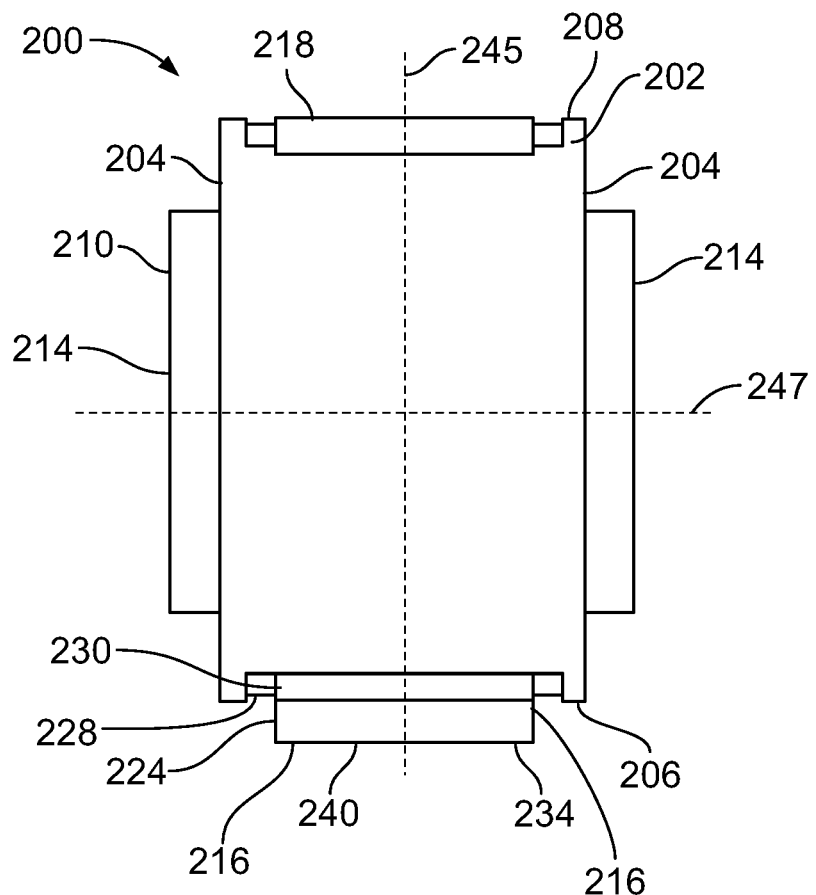
FIG. 7 illustrates a top plan view of a cargo mover, according to an embodiment of the present disclosure.
Figure 8:
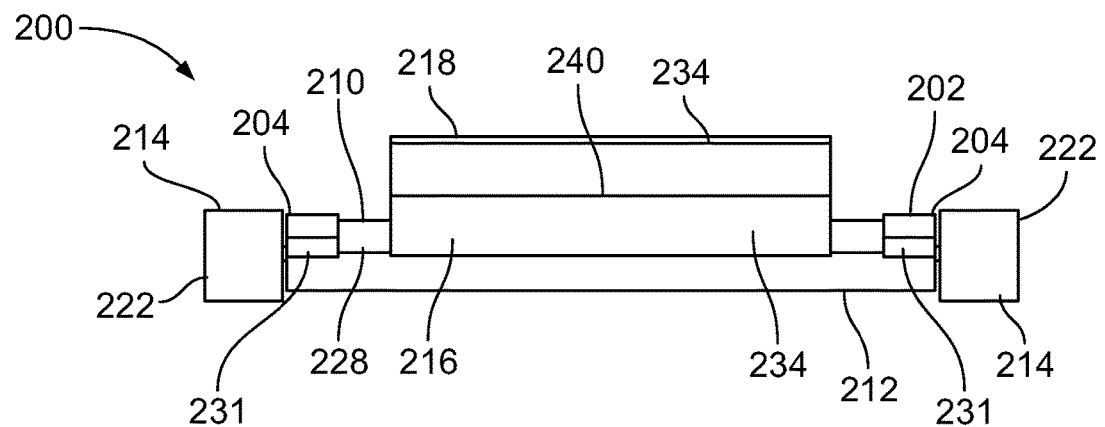
FIG. 8 illustrates a fore end view of a cargo mover, according to an embodiment of the present disclosure.
Figure 9:
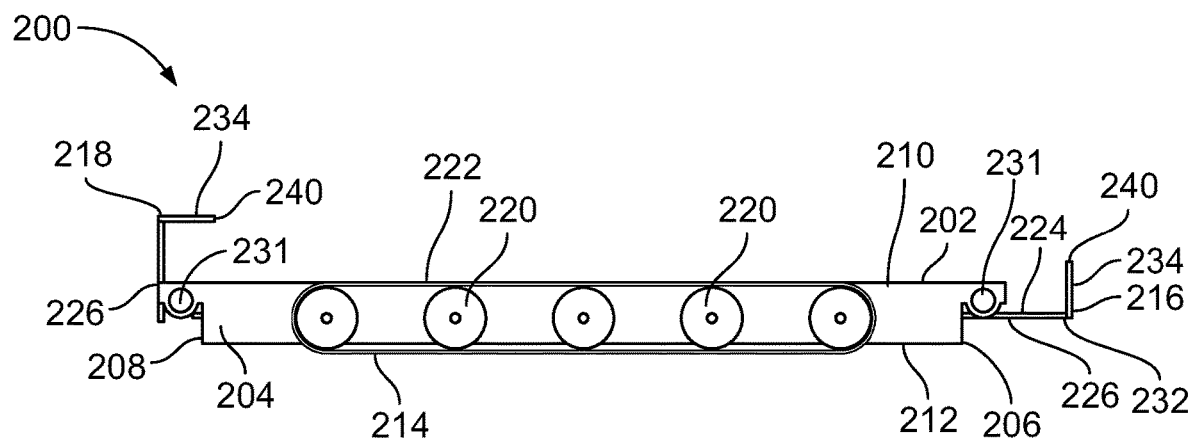
FIG. 9 illustrates a lateral view of a cargo mover, according to an embodiment of the present disclosure.

FIG. 6 illustrates a top perspective view of the cargo mover 200, according to an embodiment of the present disclosure. FIG. 7 illustrates a top plan view of the cargo mover 200. FIG. 8 illustrates a fore end view of the cargo mover 200. FIG. 9 illustrates a lateral view of the cargo mover 200. Referring to FIGS. 6-9, the cargo mover 200 includes a main housing 202 defined by lateral walls 204 integrally connected to a fore end wall 206, an aft end wall 208, an upper platform 210, and a base 212. Conveyors 214 extend outwardly from the lateral walls 204. A fore cargo coupler 216 extends from the fore end wall 206, while an aft cargo coupler 218 extends from the aft end wall 208.

Each conveyor 214 may include a plurality of wheels 220 coupled to one or more motors (hidden from view in FIG. 6) within the housing 202. A track loop 222 may extend around the wheels 220. The track loop 222 may be formed of rubber, for example. Optionally, the conveyors 214 may include more or less wheels 220 than shown. Alternatively, the conveyors 214 may not include the track loops 222.

Each of the fore cargo coupler 216 and the aft cargo coupler 218 may be a coupling bracket or paddle that includes an extension panel 224 having a first end 226 that connects to a pivot axle 228, such as through a sleeve 230. Opposite ends of the pivot axle 228 may be rotatably coupled to bearings 231 of the housing 202. A second end 232 of the extension panel 224 that is opposite from the first end 226 connects to a latching panel 234. The latching panel 234 may be perpendicular to the extension panel 224.

As shown in FIG. 6, the fore cargo coupler 216 is in a retracted position, while the aft cargo coupler 218 is shown in an extended position. The fore cargo coupler 216 and the aft cargo coupler 218 are operatively coupled to actuators (hidden from view in FIG. 6) within the housing 202 that are configured to selectively move the cargo couplers 216 and 218 between the retracted and extended positions. In the retracted positions, the latching panels 234 upwardly extend from the extension panels 224. In the retracted position, exposed outer edges 240 of the latching panels 234 may be positioned below (or flush with) a plane in which the upper platform 210 resides. That is, in the retracted positions, the latching panels 234 may not extend above a plane of the upper platform 210. In at least one embodiment, in the retracted positions, the exposed outer edges 240 of the latching panels 234 may extend over the plane of the upper platform 210 (as shown in FIG. 9), but not to a height that touches an underside of a cargo container supported on the roller tracks 108 (shown in FIG. 5, for example).

In the extended position, the latching panel 234 may be parallel with the surface of the upper platform 210. In the extended position, the extension panel 224 separates the latching panel 234 from the upper platform 210 such that at least a portion of the latching panel 234 is positioned directly over at least a portion of the upper platform 210.

When the fore and aft cargo couplers 216 and 218 are both in the same positions (that is, either the retracted or extended position), the cargo mover 200 is symmetrical about both a longitudinal axis 245 and a lateral axis 247. That is, the fore and aft ends of the cargo mover 200 may be mirror images of one another. As such, the fore end may be the aft end, and vice versa.

A remote control 250 may be used to operate the cargo mover 200. The remote control 250 is in communication with the cargo mover 200 through one or more wired or wireless connections. The remote control 250 may include one or more of a joystick, steering wheel, buttons, keys, a touchscreen interface, and/or the like that is configured to allow an operator to control the cargo mover 200. For example, the remote control 250 is in communication with one or more control units, controllers, and/or the like that are configured to operate the conveyors 214 and the cargo couplers 216 and 218. In at least one other embodiment, the cargo mover 200 may not be controlled through the remote control 250. Instead, the cargo mover 200 may be a robotic cargo mover 200 that is programmed to automatically operate without intervention by an operator.

Figure 10:
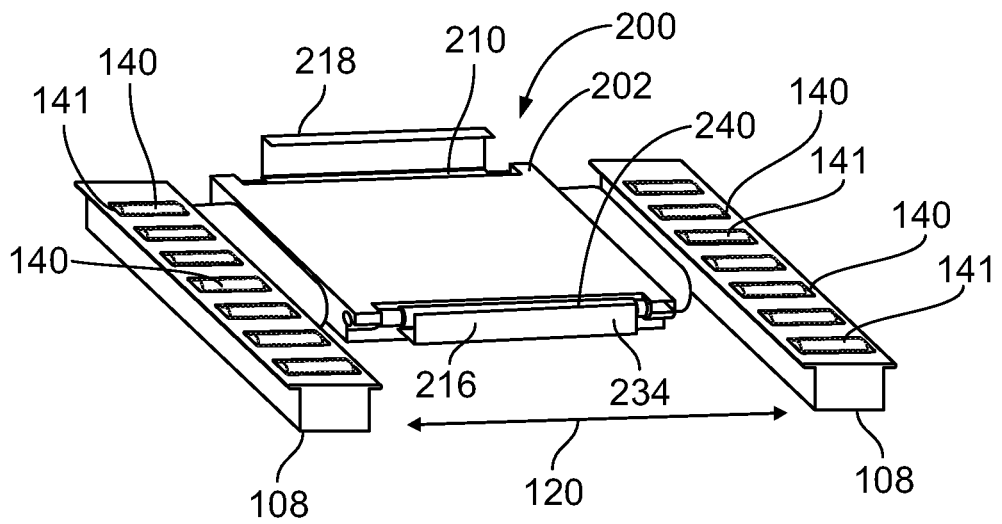
FIG. 10 illustrates a perspective top view of a cargo mover positioned between parallel roller tracks, according to an embodiment of the present disclosure.

FIG. 10 illustrates a perspective top view of the cargo mover 200 positioned between parallel roller tracks 108, according to an embodiment of the present disclosure. When the cargo mover 200 is positioned within the clearance space 120 between the parallel roller tracks 108, the upper platform 210 is positioned below an upper height 141 of the rollers 140. Further, in the retracted position, the exposed outer edges 240 of the latching panels 234 are also positioned below the upper height 141 of the rollers 140.

In this manner, the cargo containers 130 (shown in FIG. 4) are supported on the rollers 140 instead of the upper platform 210. Alternatively, the height of the housing 202 may be increased such that the upper platform 210 engages a lower surface of a cargo container 130, such that the cargo mover 200 supports at least a portion of the cargo container 130. Further, because the cargo couplers 216 and 218 are positioned below the upper height 141 of the rollers 140 while in the retracted position, the retracted cargo couplers 216 and 218 do not engage the cargo containers 130.

Figure 11:
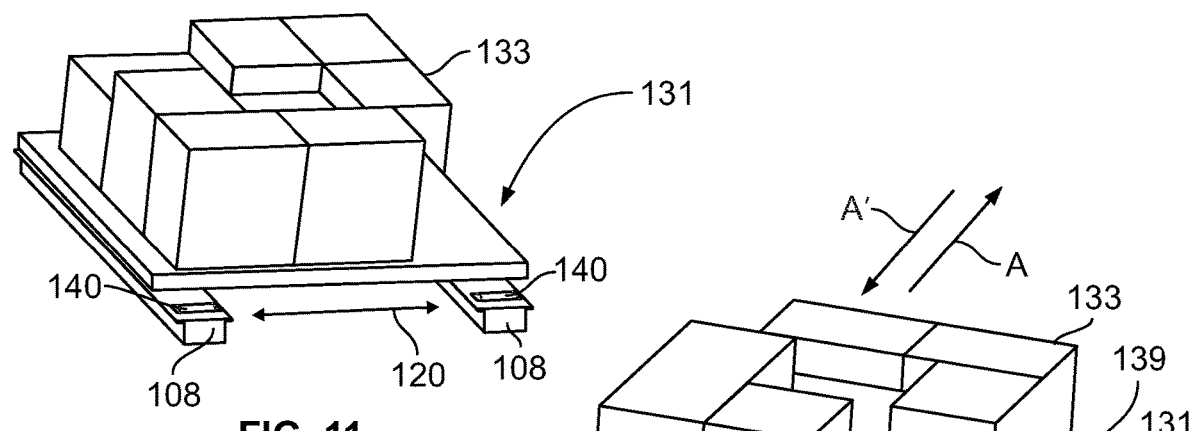
FIG. 11 illustrates a perspective top view of a cargo pallet supported on parallel roller tracks, according to an embodiment of the present disclosure.

FIG. 11 illustrates a perspective top view of a cargo pallet 131 supported on parallel roller tracks 108, according to an embodiment of the present disclosure. The cargo pallet 131 may be a base of a cargo container 130 (shown in FIG. 4). Optionally, the cargo pallet 132 may be a separate base onto which the cargo container 130 is positioned. The cargo pallet 132 supports cargo 133 thereon, or within a cargo container 130. Whether an integral part of the cargo container 130, or a separate support base for the cargo container 130, it is to be understood that the cargo pallet 131 is considered to be part of the cargo container 130.

As shown, the cargo pallet 132 is supported on rollers 140 of the roller tracks 108. The weight of the cargo 133 and the cargo container 131 are supported by the roller tracks 108. As such, the amount of weight of the cargo container 131 exerted into the cargo mover 200 is substantially less than the entire weight of the cargo container 131.

Figure 12:
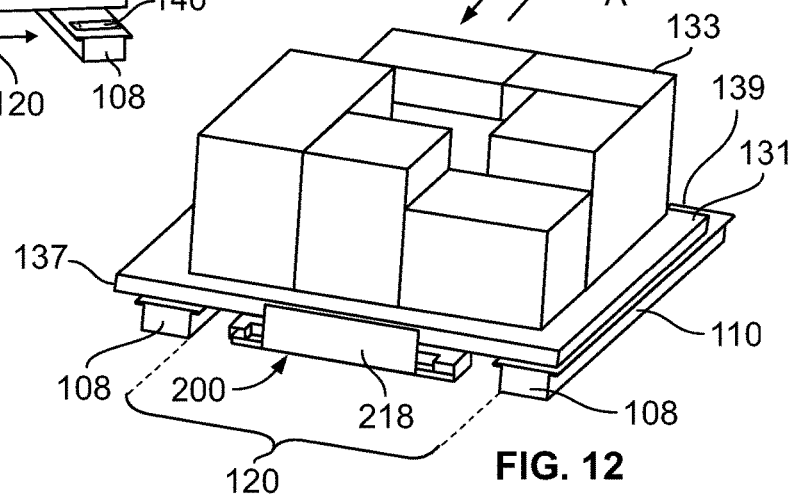
FIG. 12 illustrates a perspective top view of a cargo mover engaging a cargo pallet supported on parallel roller tracks, according to an embodiment of the present disclosure.
Figure 13:
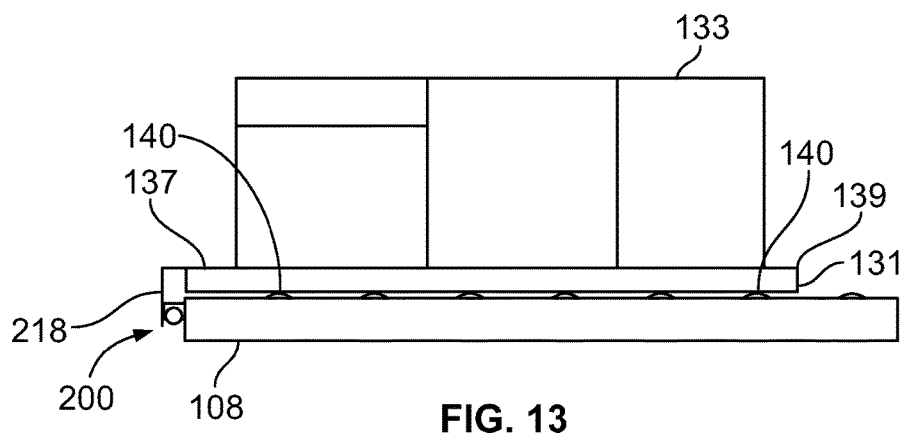
FIG. 13 illustrates a lateral view of a cargo mover engaging a cargo pallet supported on parallel roller tracks, according to an embodiment of the present disclosure.

FIG. 12 illustrates a perspective top view of the cargo mover 200 engaging the cargo pallet 131 supported on parallel roller tracks 108, according to an embodiment of the present disclosure. FIG. 13 illustrates a lateral view of the cargo mover 200 engaging the cargo pallet 131 supported on the parallel roller tracks 108. Referring to FIGS. 12 and 13, in order to move the cargo pallet 131 to a desired stowage area within a cargo holding area, the cargo mover 200 is moved within the clearance space 120 between the roller tracks 108. The fore cargo coupler 216 (hidden from view in FIGS. 12 and 13) is in the retracted position, so as to allow the cargo mover 200 to freely move into the clearance space 120 without engaging the cargo pallet 131.

As the cargo mover 200 moves linearly into the clearance space 120, the extended aft cargo coupler 218 latches onto an aft edge 137 of the cargo pallet 131. In this manner, the cargo mover 200 securely couples to the cargo pallet 131. As shown in FIG. 13, the cargo pallet 131 is supported on the rollers 140 of the roller tracks 108, instead of on the upper platform 110 of the cargo mover 200.

Once coupled to the cargo pallet 131 through the extended aft cargo coupler 218, the cargo mover 200 continues to be operated to move inwardly in the direction of arrow A. As the cargo mover 200 moves in the direction of arrow A, the coupling between the extended aft cargo coupler 218 pushes the cargo pallet 131 in the same direction, such that the rollers 140 allow the cargo pallet 131 to freely roll in response to movement of the cargo mover 200.

After the cargo pallet 131 is in a desired location within a cargo holding area, the aft cargo coupler 218 is moved into the retracted position, such that the cargo mover 200 is no longer coupled to the cargo pallet 131. The cargo mover 200 is then moved out from underneath the cargo pallet 131 in the direction of arrow A'. The cargo mover 200 may then be used to move another cargo pallet 131 in position, or removed from the cargo handling area, thereby decreasing the overall weight of the aircraft and freeing space therein.

In order to remove the cargo pallet 131 from the cargo handling area, the cargo mover 200 is moved back into the clearance space, with both the cargo couplers 216 and 218 in the retracted positions, so that the cargo mover 200 may freely move underneath the cargo pallet 131. When the cargo mover 200 is located underneath the cargo pallet 131 to a position in which the fore cargo coupler 216 (shown in FIGS. 6-10) is underneath a fore edge 137 of the cargo pallet 131, the fore cargo coupler 216 is actuated into the extended position to engage the fore edge 137. The cargo mover 200 is then moved in the direction of arrow A', which causes the cargo pallet 131 to move in response thereto.

Figure 14:
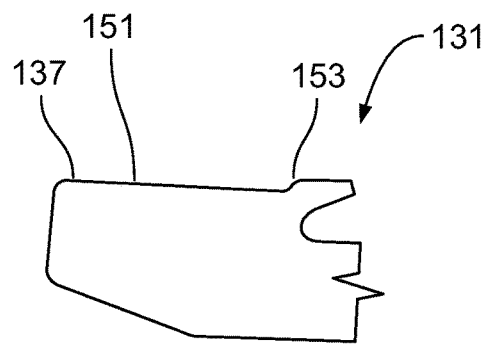
FIG. 14 illustrates a lateral view of an outer edge of a cargo pallet, according to an embodiment of the present disclosure.

FIG. 14 illustrates a lateral view of an outer edge 137 (or 139) of the cargo pallet 131, according to an embodiment of the present disclosure. The edge 137 may include a recessed surface 151 that connects to an inboard ledge 153. Referring to FIGS. 6 and 14, the cargo couplers 216 and 218 may couple to the cargo pallet 131 by way of the latching panels 234 overlaying the recessed surface 151, such that the exposed outer edge 240 abuts into the inboard ledge 153. As such, motion of the cargo mover 200 in a direction towards the cargo pallet 131 causes the outer edge 240 to exert a pushing force into the ledge 153, which forces the cargo pallet 131 to move over the rollers 140 (shown in FIGS. 11-13).

Optionally, the extended cargo couplers 216 and 218 may couple to the cargo pallet 131 in various other ways. For example, the cargo couplers 218 and 218 may include one or more protuberances (such as barbs, posts, clasps, clamps, and/or the like) that are configured to securely couple to the cargo pallet 131, or vice versa. In at least one other embodiment, the extended cargo couplers 216 and 218 may be configured to magnetically couple to the cargo pallet 131.

Figure 15:
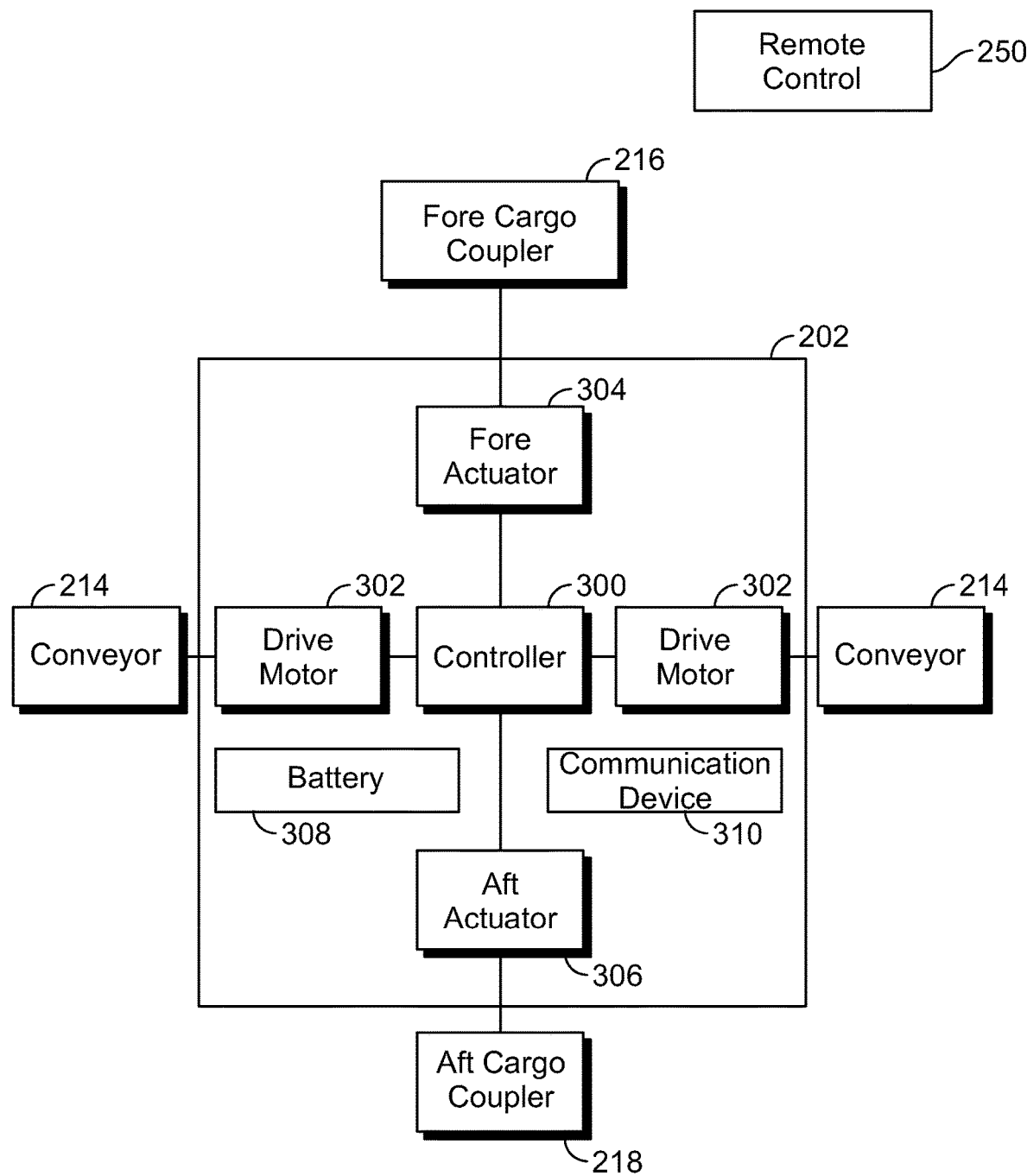
FIG. 15 illustrates a schematic block diagram of a cargo mover, according to an embodiment of the present disclosure.

FIG. 15 illustrates a schematic block diagram of the cargo mover 200, according to an embodiment of the present disclosure. The housing 202 contains a controller 300 that is configured to control operation of the cargo mover 200. The controller 300 is in communication with (such as through one or more wired or wireless connections) drive motors 302 that are operatively coupled to the conveyors 214. The controller 300 is also in communication with (such as through one or more wired or wireless connection) a fore actuator 304 and an aft actuator 306 (such as electric motors, pneumatic actuators, electric linear actuators, and/or the like) that are operatively coupled to the fore cargo couplet 216 and the aft cargo coupler 218, respectively. The housing 202 may also contain a battery 308 that is configured to provide power for operation of the cargo mover 200. The battery 308 may be a high energy density battery, such as a Li—Po, Li-ion, Li—Fe battery, or the like. The battery 308 may be rechargeable onboard the cargo mover 200, and/or may be removed from the cargo mover 200 to be recharged. In at least one other embodiment, the cargo mover 200 may be powered through other devices other than a battery. For example, the cargo mover 200 may be tethered to a power cable that is coupled to a source of power onboard the aircraft.

The cargo mover 200 may also include a communication device 310, such as a receiver, transceiver, antenna, or the like, that is configured to be in communication with the remote control 250. The remote control 250 may be used by an individual to operate the cargo mover 200. Alternatively, the cargo mover 200 may not be controlled through the remote control 250. Instead, the controller 300 may be pre-programmed to automatically operate the cargo mover 200, as a robotic cargo mover, to move cargo containers with respect to a cargo holding area. In such an embodiment, the controller 300 may include position sensors (such as global positioning system units), proximity sensors (such as infrared or ultrasonic sensors), and the like that are in communication with the controller 300, and are configured to determine a position of the cargo mover 300, as well as objects, structures, and the like in proximity to the cargo mover 200.

The controller 300 is configured to control operation of the cargo mover 200 as described above. The controller 300 is configured to control the drive motors 302 based on command inputs to move the cargo mover 200 via the conveyors 214. Further, the controller 300 is configured to control the actuators 304 and 306 to selectively move the cargo couplers 216 and 218, respectively, between retracted and extended positions based on command inputs.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the controller 300 may be or include one or more processors that are configured to control operation of the cargo mover 200, as described above.

The controller 300 is configured to execute a set of instructions that are stored in one or more data storage units or elements (such as one or more memories), in order to process data. For example, the controller 300 may include or be coupled to one or more memories. The data storage units may also store data or other information as desired or needed. The data storage units may be in the form of an information source or a physical memory element within a processing machine.

The set of instructions may include various commands that instruct the controller 300 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the controller 300. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the controller 300 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 16 illustrates a perspective top view of a cargo coupler 216 operatively coupled to an actuator 304, according to an embodiment of the present disclosure. While only the fore cargo coupler 216 and the fore actuator 304 are shown, the aft cargo coupler 218 and the aft actuator 306 may be similarly configured.

The fore cargo coupler 216 may include one or more latching panels 234 connected to a pivot axle 228, which is rotatably secured to bearings 231. An end 243 of the pivot axle 228 may be operatively coupled to the actuator 304 (such as a rotary motor) through a coupling link 249, such as a worm gear. Motion of the actuator 304 causes the coupling link 249 to rotate, which causes a corresponding rotation of the pivot axle 228, and therefore the latching panel(s) 234. Alternatively, the cargo coupler 216 may be directly coupled to the actuator 304 at an end, without a coupling link.

The cargo coupler 216 may also include a locking protuberance 223, such as a ridge, expanded bump, or the like. The locking protuberance 223 is configured to abut against or into a portion of the housing 202 (shown in FIG. 6) in the extended position to lock the cargo coupler 216 in place without the actuator 304 exerting effort. Optionally, the cargo coupler 216 may not include the locking protuberance 223.

FIG. 17 illustrates a lateral view of a cargo coupler 400 in an extended position, according to an embodiment of the present disclosure. FIG. 18 illustrates a lateral view of the cargo coupler 400 in a retracted position. Referring to FIGS. 17 and 18, the cargo coupler 400 may be used in place of either the cargo couplers 216 and 218, shown in FIG. 6, for example.

Instead of rotating between the extended and retracted position, the cargo coupler 400 may linearly extend between extended and retracted positions. In this manner, the extension panel 402 may include a track, channel, or the like that is moveably secured to a reciprocal protuberance 404 extending from a sleeve 406. An actuator is configured to move the extension panel 402 over the protuberance 404 in the directions of arrows A, so that the latching panel 408 may selectively couple and decouple from a container pallet.

Alternatively, the cargo coupler 400 may be configured to move between extended and retracted positions in various other ways. For example, the extension panel 402 may be configured to telescope between expanded and retracted positions.

Figure 19:
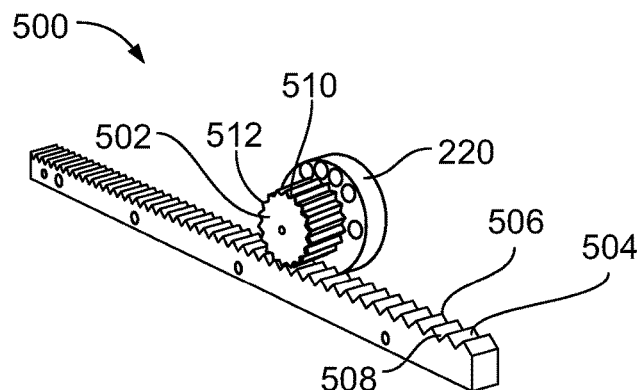
FIG. 19 illustrates a perspective lateral view of a traction sub-system, according to an embodiment of the present disclosure.

FIG. 19 illustrates a perspective lateral view of a traction sub-system 500, according to an embodiment of the present disclosure. Referring to FIGS. 6 and 17, the traction sub-system 500 may include a gear wheel 502 that is coaxial with a wheel 220 and extends outwardly therefrom. Each wheel 220 may include a gear wheel 220. The gear wheel 220 couples to a gear track 504 that is secured to an inboard side of a roller track 108 (shown in FIG. 10), and or formed within an inboard side of the roller track 108. The gear track 504 includes teeth 506 alternately separated by channels 508 that engage reciprocal channels 510 and teeth 512 of the gear wheel 502.

As the wheels 220 rotate, the gear wheels 502 engage the gear track 504. The interaction between the teeth 506/channels 508 of the gear track 504 with the channels 510/teeth 512 of the gear wheel 502 provides tractive force that assists movement of the cargo mover 200, such as in wet and slippery conditions. The traction sub-system 500 may also include one or more brakes.

Figure 20:
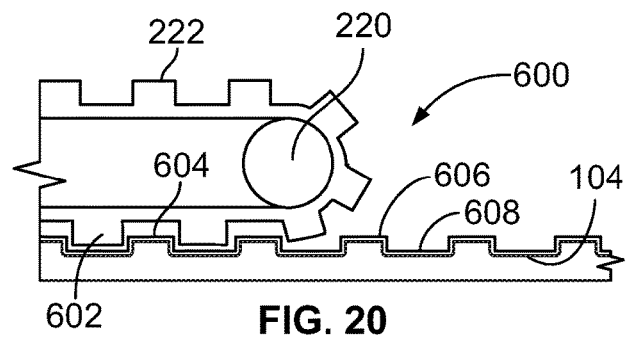
FIG. 20 illustrates a lateral view of a traction sub-system, according to an embodiment of the present disclosure.

FIG. 20 illustrates a lateral view of a traction sub-system 600, according to an embodiment of the present disclosure. In this embodiment, the traction sub-system 600 includes teeth 602 alternately separated by gaps 604 on an outer surface of the track loop 222. Reciprocal teeth 606 and gaps 608 are formed in the floor 104 between the roller tracks 108 (shown in FIG. 10). The teeth 602 of the track loop 222 extend into the gaps 608 of the floor 104, while the teeth 606 of the floor fit into the gaps 604 of the track loop 222 as the track loop rotates over the floor 104. In this manner, the cooperation between the teeth 602/gaps 606 of the track loop 222 with the gaps 608/teeth 606 of the floor 104 provides tractive assistance to the cargo mover 200. Alternatively, if the cargo mover 200 does not include the track loops 222, the teeth 602 and gaps 604 may be formed on individual wheels 220.

Figure 21:
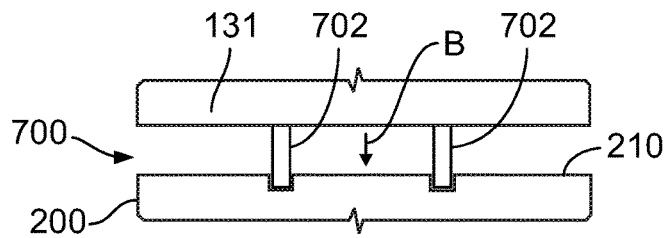
FIG. 21 illustrates a lateral view of a traction sub-system, according to an embodiment of the present disclosure.

FIG. 21 illustrates a lateral view of a traction sub-system 700, according to an embodiment of the present disclosure. In this embodiment, the traction sub-system 700 includes one or more traction couplers 702 that are configured to be moved between extended (as shown in FIG. 21) and retracted positions in relation to the upper platform 210. In at least one embodiment, the traction couplers 702 are spring-biased posts, columns, studs, or the like. In at least one other embodiment, the traction couplers 702 are not spring-biased.

The traction couplers 702 are moved into the extended positions to engage an underside of the cargo pallet 131. As the traction couplers 702 engage the cargo pallet 131, a portion of the weight of the cargo pallet 131 is supported by the cargo mover 200 (instead of just the roller tracks 108). The force exerted by the cargo pallet 131 in the direction of arrow B is exerted into the cargo mover 200 through the traction coupler 702. The downward force of the cargo pallet 131 in the direction of arrow B is exerted into the floor 104 (not shown in FIG. 21), thereby providing increased friction therewith and traction assistance to the cargo mover 200. The traction couplers 702 may be retracted so as not to engage the cargo pallet 131.

In at least one other embodiment, the traction couplers 702 may be spring-biased protuberances that remain in extended positions. In this embodiment, the traction couplers 702 may not be moved between extended and retracted positions.

Figure 22:
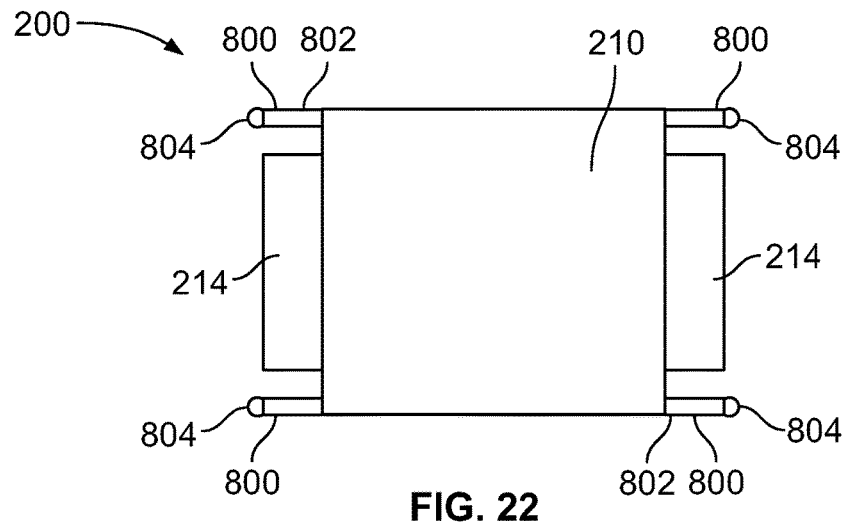
FIG. 22 illustrates a top plan view of a cargo mover, according to an embodiment of the present disclosure.

FIG. 22 illustrates a top plan view of the cargo mover 200, according to an embodiment of the present disclosure. As shown, the cargo mover 200 may include guide rollers 800 that extend from lateral surfaces of the housing 202. The guide rollers 800 include brackets 802 that rotatably retain wheels 804 at distal ends. The wheels 804 are configured to rotatably engage inner surfaces of the roller tracks 108 (shown in FIG. 10) to orient and center the cargo mover 200 within the clearance space 120. The cargo mover 200 may include more or less guide rollers 800 than shown.

Figure 23:
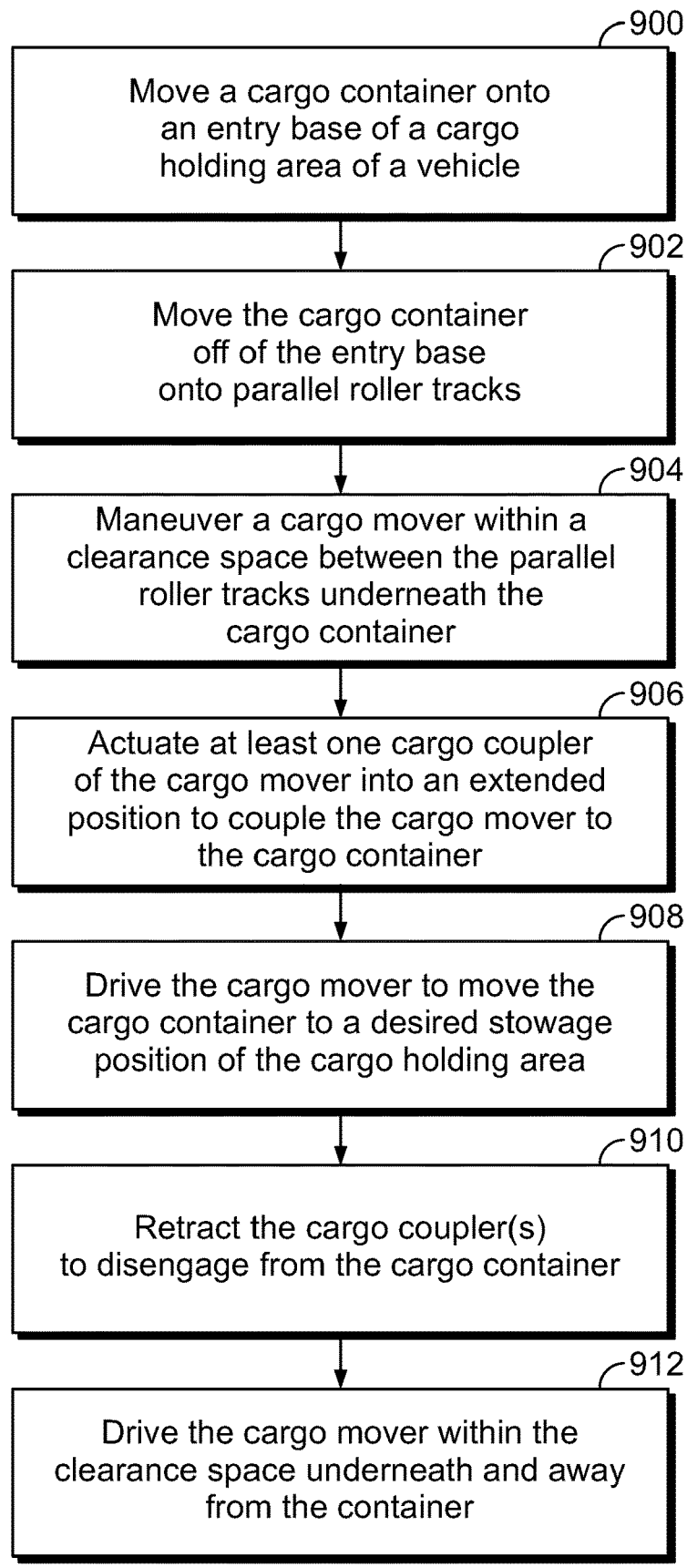
FIG. 23 illustrate a flow chart of a method of moving a cargo container into a stowage area of a cargo holding area, according to an embodiment of the present disclosure.

FIG. 23 illustrate a flow chart of a method of moving a cargo container into a stowage area of a cargo holding area, according to an embodiment of the present disclosure. The method begins at 900, in which a cargo container is moved onto an entry base of a cargo holding area of a vehicle. At 902, the cargo container is moved off of the entry base onto parallel roller tracks. At 904, a cargo mover is maneuvered within a clearance space between the parallel roller tracks underneath the cargo container. At 906, at least one cargo coupler of the cargo mover is actuated into an extended position to couple the cargo mover to the cargo container. At 908, the cargo mover is driven to move the cargo container to a desired stowage position of the cargo holding area. At 910, the cargo coupler(s) are retracted to disengage from the cargo container. At 912, the cargo mover is then driven within the clearance space underneath and away from the cargo container.

Referring to FIGS. 1-23, embodiments of the present disclosure provide a cost effective cargo handling system that may not include fixed power drive units, or at least substantially less power drive units that known cargo handling systems. Accordingly, embodiments of the present disclosure provide a lighter and simpler cargo handling system, which reduces an overall weight of a vehicle. Because the vehicle is lighter, less fuel is burned during operation. Moreover, less carbon dioxide is emitted during operation. The cargo mover may be easily removed from the vehicle after cargo has been loaded within the cargo holding area. The cargo mover may be easily serviced and maintained, such as at locations away from the vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cargo handling system configured to load and unload a cargo container with respect to a cargo holding area of a vehicle, the cargo handling system comprising:
   roller tracks extending from a floor, wherein the roller tracks are separated by a clearance space, and wherein the roller tracks include rollers that are configured to rotatably support the cargo container; and a mobile cargo mover that is configured to move within the clearance space, wherein the cargo mover comprises at least one guide roller that is configured to abut into at least one of the roller tracks, wherein the cargo mover is configured to engage the cargo container to move the cargo container on the roller tracks, and wherein the cargo mover is configured to disengage the cargo container to move away from the cargo container.

2. The cargo handling system of claim 1, wherein the cargo mover is configured to move over a surface of the floor.

3. The cargo handling system of claim 1, wherein the cargo mover is configured to be moved into and out of the cargo holding area.

4. The cargo handling system of claim 1, wherein the cargo mover is not fixed in position on the floor.

5. The cargo handling system of claim 1, wherein the cargo mover is configured to support less than all of the weight of the cargo container.

6. The cargo handling system of claim 1, wherein the cargo mover further comprises:
a main housing;
at least one conveyor extending from the main housing wherein the at least one conveyor is configured to move the cargo mover over the floor; and
at least one cargo coupler extending from the main housing, wherein the at least one cargo coupler is moveable between a retracted position in which the at least one cargo coupler is decoupled from the cargo container, and an extended position in which the at least one cargo coupler couples to the cargo container.

7. The cargo handling system of claim 6, wherein the at least one conveyor comprises:
a first conveyor extending from a first side of the main housing; and
a second conveyor extending from a second side of the main housing.

8. The cargo handling system of claim 6, wherein the at least one conveyor comprises:
a plurality of wheels; and
one or more motors operatively coupled to at least one of the plurality of wheels.

9. The cargo handling system of claim 8, wherein the at least one conveyor further comprises a track loop extend around at least some of the plurality of wheels.

10. The cargo handling system of claim 6, wherein the at least one cargo coupler comprises:
a first cargo coupler extending from a first end of the main housing; and
a second cargo coupler extending from a second end of the main housing.

11. The cargo handling system of claim 6, wherein the at least one cargo coupler comprises:
an extension panel having a first end that connects to a pivot axle, and a second end of the extension panel that is opposite from the first end that connects to a latching panel, wherein the latching panel is configured to engage the cargo container when the at least one cargo coupler is in the extended position; and
an actuator coupled to the pivot axle, wherein the actuator is configured to move the at least one cargo coupler between the extended position in which the latching panel engages the cargo container, and the retracted position in which the latching panel disengages from the cargo container.

12. The cargo handling system of claim 1, wherein the cargo mover is symmetrical about longitudinal and lateral axes.

13. The cargo handling system of claim 1, further comprising a remote control in communication with the cargo mover, wherein the remote control is configured to control operation of the cargo mover.

14. The cargo handling system of claim 1, wherein the cargo mover comprises a controller that is configured to control operation of the cargo mover.

15. The cargo handling system of claim 1, further comprising a traction sub-system that is configured to allow the cargo mover to exert tractive force into the floor.

16. The cargo handling system of claim 15, wherein the traction sub-system comprises:
one or more gear wheels extending from the main housing; and
one or more gear tracks secured to one or both of the floor or roller tracks, wherein the one or more gear wheels are configured to engage the one or more gear tracks.

17. The cargo handling system of claim 15, wherein the traction sub-system comprises:
a plurality of first teeth alternately separated by a plurality of first gaps of at least one conveyor of the cargo mover; and
a plurality of second teeth alternately separated by a plurality of second gaps formed on the floor.

18. The cargo handling system of claim 15, wherein the traction sub-system comprises one or more traction couplers that extend from the cargo mover, wherein the one or more traction couplers are configured to abut into an underside of the cargo container.

19. The cargo handling system of claim 18, wherein the one or more traction couplers are configured to be moved between retracted and extended positions.

20. The cargo handling system of claim 18, wherein the one or more traction couplers are spring-biased.

21. The cargo handling system of claim 1, wherein the cargo mover comprises:
a main housing;
at least one conveyor extending from the main housing, wherein the at least one conveyor is configured to move the cargo mover over the floor; and
at least one drive motor on or within the main housing, wherein the at least one drive motor is operatively coupled to the at least one conveyor to move the cargo mover over the floor.

22. A vehicle comprising:
a cargo handling area defined by interior walls and a floor; and
a cargo handling system configured to load and unload a cargo container with respect to the cargo holding area, the cargo handling system comprising:
roller tracks extending from a floor, wherein the roller tracks are separated by a clearance space, and wherein the roller tracks include rollers that are configured to rotatably support the cargo container; and
a mobile cargo mover that is configured to move within the clearance space, wherein the cargo mover comprises at least one guide roller that is configured to abut into at least one of the roller tracks, wherein the cargo mover is configured to engage the cargo container to move the cargo container on the roller tracks, wherein the cargo mover is configured to disengage the cargo container to move away from the cargo container, wherein the cargo mover is configured to move over a surface of the floor, wherein the cargo mover is configured to be moved into and out of the cargo holding area, wherein the cargo mover is not fixed in position on the floor, wherein the cargo mover is configured to support less than all of the weight of the cargo container.

23. The vehicle of claim 22, wherein the cargo mover further comprises:
a main housing;
at least one conveyor extending from the main housing, wherein the at least one conveyor is configured to move the cargo mover over the floor; and
at least one cargo coupler extending from the main housing, wherein the at least one cargo coupler is moveable between a retracted position in which the at least one cargo coupler is decoupled from the cargo container, and an extended position in which the at least one cargo coupler couples to the cargo container.

24. The vehicle of claim 23, wherein the at least one conveyor comprises:
a first conveyor extending from a first side of the main housing, and
a second conveyor extending from a second side of the main housing.

25. The vehicle of claim 23, wherein the at least one conveyor comprises:
a plurality of wheels; and
one or more motors operatively coupled to at least one of the plurality of wheels.

26. The vehicle of claim 25, wherein the at least one conveyor further comprises a track loop extend around at least some of the plurality of wheels.

27. The vehicle of claim 23, wherein the at least one cargo coupler comprises:
a first cargo coupler extending from a first end of the main housing; and
a second cargo coupler extending from a second end of the main housing.

28. The vehicle of claim 23, wherein the at least one cargo coupler comprises:
an extension panel having a first end that connects to a pivot axle, and a second end of the extension panel that is opposite from the first end that connects to a latching panel, wherein the latching panel is configured to engage the cargo container when the at least one cargo coupler is in the extended position; and
an actuator coupled to the pivot axle, wherein the actuator is configured to move the at least one cargo coupler between the extended position in which the latching panel engages the cargo container, and the retracted position in which the latching panel disengages from the cargo container.

29. The vehicle of claim 22, wherein the cargo mover is symmetrical about longitudinal and lateral axes.

30. The vehicle of claim 22, further comprising a remote control in communication with the cargo mover, wherein the remote control is configured to control operation of the cargo mover.

31. The vehicle of claim 22, wherein the cargo mover comprises a controller that is configured to control operation of the cargo mover.

32. The vehicle of claim 22, wherein the cargo handling system further comprises a traction sub-system that is configured to allow the cargo mover to exert tractive force into the floor.

33. The vehicle of claim 32, wherein the traction sub-system comprises:
one or more gear wheels extending from the main housing, and
one or more gear tracks secured to one or both of the floor or roller tracks, wherein the one or more gear wheels are configured to engage the one or more gear tracks.

34. The vehicle of claim 32, wherein the traction sub-system comprises:
a plurality of first teeth alternately separated by a plurality of first gaps of at least one conveyor of the cargo mover; and
a plurality of second teeth alternately separated by a plurality of second gaps formed on the floor.

35. The vehicle of claim 32, wherein the traction sub-system comprises one or more traction couplers that extend from the cargo mover, wherein the one or more traction couplers are configured to abut into an underside of the cargo container.

36. The vehicle of claim 35, wherein the one or more traction couplers are configured to be moved between retracted and extended positions.

37. The vehicle of claim 35, wherein the one or more traction couplers are spring-biased.

38. The vehicle of claim 22, wherein the cargo mover comprises:
a main housing;
at least one conveyor extending from the main housing, wherein the at least one conveyor is configured to move the cargo mover over the floor; and
at least one drive motor on or within the main housing, wherein the at least one drive motor is operatively coupled to the at least one conveyor to move the cargo mover over the floor.

39. A cargo handling system configured to load and unload a cargo container with respect to a cargo holding area of a vehicle, the cargo handling system comprising:
roller tracks extending from a floor, wherein the roller tracks are separated by a clearance space, and wherein the roller tracks include rollers that are configured to rotatably support the cargo container; and
a mobile cargo mover that is configured to move within the clearance space, wherein the cargo mover is configured to engage the cargo container to move the cargo container on the roller tracks, and wherein the cargo mover is configured to disengage the cargo container to move away from the cargo container, wherein the cargo mover comprises:
a main housing;
at least one conveyor extending from the main housing, wherein the at least one conveyor is configured to move the cargo mover over the floor, wherein the at least one conveyor comprises a plurality of wheels, one or more motors operatively coupled to at least one of the plurality of wheels, and a track loop extend around at least some of the plurality of wheels; and
at least one cargo coupler extending from the main housing, wherein the at least one cargo coupler is moveable between a retracted position in which the at least one cargo coupler is decoupled from the cargo container, and an extended position in which the at least one cargo coupler couples to the cargo container.

40. A cargo handling system configured to load and unload a cargo container with respect to a cargo holding area of a vehicle, the cargo handling system comprising:
roller tracks extending from a floor, wherein the roller tracks are separated by a clearance space, and wherein the roller tracks include rollers that are configured to rotatably support the cargo container;
a mobile cargo mover that is configured to move within the clearance space, wherein the cargo mover is configured to engage the cargo container to move the cargo container on the roller tracks, and wherein the cargo mover is configured to disengage the cargo container to move away from the cargo container; and
a traction sub-system that is configured to allow the cargo mover to exert tractive force into the floor, wherein the traction sub-system comprises:
one or more gear wheels extending from the main housing; and
one or more gear tracks secured to one or both of the floor or roller tracks, wherein the one or more gear wheels are configured to engage the one or more gear tracks.

41. A cargo handling system configured to load and unload a cargo container with respect to a cargo holding area of a vehicle, the cargo handling system comprising:
roller tracks extending from a floor, wherein the roller tracks are separated by a clearance space, and wherein the roller tracks include rollers that are configured to rotatably support the cargo container;
a mobile cargo mover that is configured to move within the clearance space, wherein the cargo mover is configured to engage the cargo container to move the cargo container on the roller tracks, and wherein the cargo mover is configured to disengage the cargo container to move away from the cargo container; and
a traction sub-system that is configured to allow the cargo mover to exert tractive force into the floor, wherein the traction sub-system comprises:
a plurality of first teeth alternately separated by a plurality of first gaps of at least one conveyor of the cargo mover, and
a plurality of second teeth alternately separated by a plurality of second gaps formed on the floor.

42. A vehicle comprising:
a cargo handling area defined by interior walls and a floor; and
a cargo handling system configured to load and unload a cargo container with respect to the cargo holding area, the cargo handling system comprising:
roller tracks extending from a floor, wherein the roller tracks are separated by a clearance space, and wherein the roller tracks include rollers that are configured to rotatably support the cargo container; and
a mobile cargo mover that is configured to move within the clearance space, wherein the cargo mover is configured to engage the cargo container to move the cargo container on the roller tracks, and wherein the cargo mover is configured to disengage the cargo container to move away from the cargo container, wherein the cargo mover is configured to move over a surface of the floor, wherein the cargo mover is configured to be moved into and out of the cargo holding area, wherein the cargo mover is not fixed in position on the floor, wherein the cargo mover is configured to support less than all of the weight of the cargo container, wherein the cargo mover comprises: (a) a main housing; (b) at least one conveyor extending from the main housing, wherein the at least one conveyor is configured to move the cargo mover over the floor, wherein the at least one conveyor comprises a plurality of wheels, one or more motors operatively coupled to at least one of the plurality of wheels, and a track loop extend around at least some of the plurality of wheels; and (c) at least one cargo coupler extending from the main housing, wherein the at least one cargo coupler is moveable between a retracted position in which the at least one cargo coupler is decoupled from the cargo container, and an extended position in which the at least one cargo coupler couples to the cargo container.

43. A vehicle comprising:
a cargo handling area defined by interior walls and a floor; and
a cargo handling system configured to load and unload a cargo container with respect to the cargo holding area, the cargo handling system comprising:
roller tracks extending from a floor, wherein the roller tracks are separated by a clearance space, and wherein the roller tracks include rollers that are configured to rotatably support the cargo container;
a mobile cargo mover that is configured to move within the clearance space, wherein the cargo mover is configured to engage the cargo container to move the cargo container on the roller tracks, and wherein the cargo mover is configured to disengage the cargo container to move away from the cargo container, wherein the cargo mover is configured to move over a surface of the floor, wherein the cargo mover is configured to be moved into and out of the cargo holding area, wherein the cargo mover is not fixed in position on the floor, wherein the cargo mover is configured to support less than all of the weight of the cargo container; and
a traction sub-system that is configured to allow the cargo mover to exert tractive force into the floor, wherein the traction sub-system comprises: (a) one or more gear wheels extending from the main housing; and (b) one or more gear tracks secured to one or both of the floor or roller tracks, wherein the one or more gear wheels are configured to engage the one or more gear tracks.

44. A vehicle comprising:
a cargo handling area defined by interior walls and a floor; and
a cargo handling system configured to load and unload a cargo container with respect to the cargo holding area, the cargo handling system comprising:
roller tracks extending from a floor, wherein the roller tracks are separated by a clearance space, and wherein the roller tracks include rollers that are configured to rotatably support the cargo container;
a mobile cargo mover that is configured to move within the clearance space, wherein the cargo mover is configured to engage the cargo container to move the cargo container on the roller tracks, and wherein the cargo mover is configured to disengage the cargo container to move away from the cargo container, wherein the cargo mover is configured to move over a surface of the floor, wherein the cargo mover is configured to be moved into and out of the cargo holding area, wherein the cargo mover is not fixed in position on the floor, wherein the cargo mover is configured to support less than all of the weight of the cargo container; and
a traction sub-system that is configured to allow the cargo mover to exert tractive force into the floor, wherein the traction sub-system comprises: (a) a plurality of first teeth alternately separated by a plurality of first gaps of at least one conveyor of the cargo mover; and (b) a plurality of second teeth alternately separated by a plurality of second gaps formed on the floor.

\* \* \* \* \*